United States Patent [19]

Sugiura et al.

[11] 4,390,984

[45] Jun. 28, 1983

[54] STATUS CHECK METHOD FOR A DATA TRANSMISSION SYSTEM

[75] Inventors: Kazumasa Sugiura, Katsuta; Kinji Mori, Kawasaki; Hirokazu Ihara, Machida; Yoshinori Kawai, Katsuta, all of Japan

[73] Assignee: Hitachi, Ltd., Tokyo, Japan

[21] Appl. No.: 300,622

[22] Filed: Sep. 9, 1981

[30] Foreign Application Priority Data

Sep. 12, 1980 [JP] Japan .............................. 55-125965

[51] Int. Cl.³ .............................................. H04J 3/08
[52] U.S. Cl. .................................................. 370/88
[58] Field of Search .................... 370/88, 86, 87, 90, 370/99, 105, 106, 13, 15, 110.1; 371/22

Primary Examiner—Thomas A. Robinson
Attorney, Agent, or Firm—Antonelli, Terry & Wands

[57] ABSTRACT

In a data transmission system with such a construction that a plurality of terminal units are connected to a first and a second loop transmission line for transmitting messages in a first direction and in a second direction which is opposite to said first direction, respectively, through a pair of transmission control units (the one unit being connected to said first loop transmission line with the other unit being connected to said second loop transmission line), each transmission control unit sends a check message sequentially in order to check the state of a minor loop which connects two adjacent pairs of transmission control units. This check message has a data field, in which an initial value is set at the sending time. The value of this data field is incremented by one in each transmission control unit through which the message passes to make a round through the minor loop. Each transmission control unit decides as to whether the value of the data field of the received check message has a prescribed value or not, thereby to discriminate if the message generated by the transmission control unit itself has made a round through the minor loop and returned. If the sent out check message is not received within a prescribed period (after sending), the transmission control unit confirms the presence of an abnormality on a minor loop with the unit as a start point, and thereafter switches its operation to use the bypass transmission line for sending usual messages.

10 Claims, 17 Drawing Figures

STATUS CHECK METHOD FOR A DATA TRANSMISSION SYSTEM

BACKGROUND OF THE INVENTION

This invention relates to a status check method for a data transmission system in which a plurality of terminal units are mutually connected by a first and a second loop transmission line for transmitting data in a first direction and a second direction which is opposite to said first direction, respectively.

Figure 1:
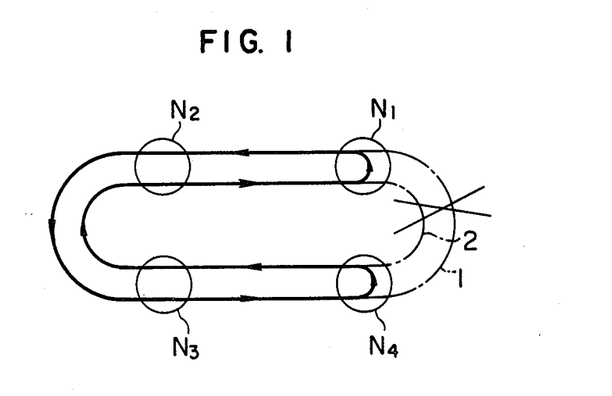
FIG. 1 is a diagram for illustrating the outline of a publicly known data transmission system with loop transmission lines.

The data transmission system has such a very simple structure that basically a transmission line is arranged in the form of a loop, at arbitrary positions of which nodes (a kind of switch for a data transmission control unit) are provided. Since such a data transmission system often has node and line troubles, a data transmission system having dual loop transmission line as shown in FIG. 1 has been developed, recently. In such a system, in order that, even if both loop transmission lines 1 and 2 are broken at a point between the nodes $N_1$, $N_2$, $N_3$ and $N_4$ of the same structure, the whole system may not break down, the data transmission of the loop transmission lines 1 and 2 are executed in the respective directions which are opposite to each other. That is, the nodes $N_1$, $N_2$, $N_3$, and $N_4$ have a loop-back function. For example, even when the loop transmission lines 1 and 2 are separated at a position denoted by X, data can still be circulated by connecting two loop transmission lines at $N_1$ and $N_4$ which are adjacent to the broken point. The trouble point detection that should be done before the above-mentioned loop-back operation has been made as follows. That is, a transmission control unit which forms a loop node sends out a loop check message for specifying an address of loop-back, and it is checked whether this message returns. Further, in a system of the prior applications of the present applicants (the Japanese patent application No. 115300/79 and the corresponding foreign patent applications of U.S. Ser. No. 149,632, Germany Application No. P3020077.2 and France Application No. 8011986) where transmission control units are connected in the respective dual loop transmission lines and further bypass transmission lines are provided between the corresponding pairs of the transmission control units, each transmission control unit sends out a loop check message attached with an address thereof. It is checked whether the message makes a round on a minor loop formed by two adjacent pairs of transmission control units (hereinafter referred to as a minor loop check).

Both of the above-mentioned trouble detection methods require insertion of an address in the check message. However, when a new node is added to the loop transmission line, or when its own stored address of the transmission control unit at a node is vanished after recovery from a trouble, it may happen that the node address is unknown. In such a case, prior to the abnormality detection of the system, it is necessary to investigate the address status of other nodes in the system and to set a new node address manually such that it is not equal to those of the other nodes.

Therefore, the above-mentioned two trouble detection methods are defective in that loop check is not possible before the addresses of the added and recovered nodes are set.

SUMMARY OF THE INVENTION

One object of this invention is to provide a status check method for a data transmission system in which a transmission control unit for generating a status check message of the system does not need to know the addresses of the other transmission control units.

Another object of this invention is to provide a status check method which is suited to the detection of an abnormal point of the data transmission system and also suited to the detection of recovery from the abnormal state.

A further object of this invention is to provide a status check method for a data transmission system in which a transmission control unit whose address is vanished by a trouble and a transmission control unit newly added to the system each can know its own address.

In order to attain these objects, the invention provides a status check method for a data transmission system, said system comprising a first major loop formed by connecting a plurality of first transmission control units for the control of message transmission with a first loop transmission line for sending the message in a first direction; a second major loop formed by connecting a plurality of second transmission control unit for the control of message transmission with a second loop transmission line for transmitting the message in a second direction opposite to said first direction, said first transmission control unit being in a paired relation with said second transmission control unit; a bypass transmission line capable of bidirectional message transmission and connecting said first and second transmission control units; and a plurality of terminal units provided for each pair of said first and second transmission control units and connected to at least one of said first and second transmission control units to perform sending and selective receiving of a message to and from said first and second major loop;

said first and second transmission control units having first register means for storing a bypass flag which is referred to for deciding as to whether the message should be given to said bypass transmission line or to said loop transmission line, and second register means for storing its own address which should be compared with an address field contained in said received message indicating a transmission source, thereby to decide as to whether the received message is a self-generated message; said method being characterized by the following steps:

a first step where one of said first and second transmission control units sends to the loop transmission line, a check message which contains a data field with an initial value set and a code field indicating a function of checking the state of the minor loop (which connects two adjacent pairs of transmission control units, the one pair containing its own transmission control unit while the other pair containing those on the downstream side), and starts a time counting operation to know the time-over of return time of said check message;

a second step where three transmission control units on said minor loop except the transmission control unit that has sent out said check message rewrite the values of data fields in the received check messages in accordance with a prescribed rule and thereafter transfer the messages to adjacent transmission control units on said minor loop; and a third step where said first or second transmission control unit that has sent out said check message decides as to whether the value of the data field in the received message is equal to a prescribed value, and if equality is confirmed, the above-mentioned time counting operation is interrupted while, if a time-over is detected, a bypass flag is set for instructing said first register means to supply subsequent message outputs to said bypass transmission line.

In a transmission control unit which has transmitted a normal message, if it is detected that the message does not make a round on the major loop and return within a prescribed time, a minor loop check message is transmitted first. In this case, adjacent transmission control units on the downstream side of the units that have sent out the minor loop check message are forced to transfer the received check message to respective paired transmission control units and send a new minor loop check message, with an initial value set at its data field, toward a minor loop the starting point of which is formed by those adjacent transmission control units themselves. Through a similar continuous operation of each transmission control unit on the major loop, the minor loop check operation propagates in the direction of data transmission of the one major loop. Further, a transmission control unit that has received first the minor loop check message is forced to send a request message for a minor loop check toward a corresponding paired transmission control unit. Thus, with the latter transmission control unit as a start point, the minor loop check operation propagates continuously in the direction of data transmission on the other major loop as well. In this manner, a major loop combining the first and second major loops can be formed, in which an abnormality occurrence point is detected and loop-back of messages is done on both sides of the point.

According to one embodiment of this invention, a major loop check message for detecting the recovery of an abnormality is periodically sent by each transmission control unit, adjacent to the point of abnormality occurrence, which is executing a message bypassing operation or in the first register of which a bypass flag is set. This check message is given to the loop transmission line. If the abnormality is recovered, the check message that has made a round on the loop returns to the transmission control unit i.e. the sending source. Therefore, each transmission control unit under the bypass operation discriminates if the received message is either a major loop check message sent by itself or not.

According to another embodiment of this invention, a transmission control unit that has confirmed the normal state of the major loop sends a particular message to the major loop when the bypass operation is cancelled. If there is a transmission control unit its own address of which is not yet set or vanished by a certain abnormality, or a newly set transmission control unit, exists in the data transmission system, the transmission control unit is forced to send a message which contains a function code indicating an automatic address set at the receiving time of the above particular message. Further, all the transmission control units in the data transmission system are made to add its own address as stored in the second register to the data field in the message, when the automatic address set message is received, and to send this message to a following transmission control unit. In this way, the values of addresses of the whole transmission control units which currently belong to the major loop are written into the automatic address set message. Therefore, a transmission control unit which has sent this message, but its own address of which is undefined, can find its own address to be set in the first register from a group of address values contained in the received automatic address set message.

The foregoing and other objects, advantages, manner of operation and novel features of the present invention will be understood from the following detailed description when read in connection with the accompanying drawings.

DESCRIPTION OF THE PREFERRED EMBODIMENTS

Figure 2:
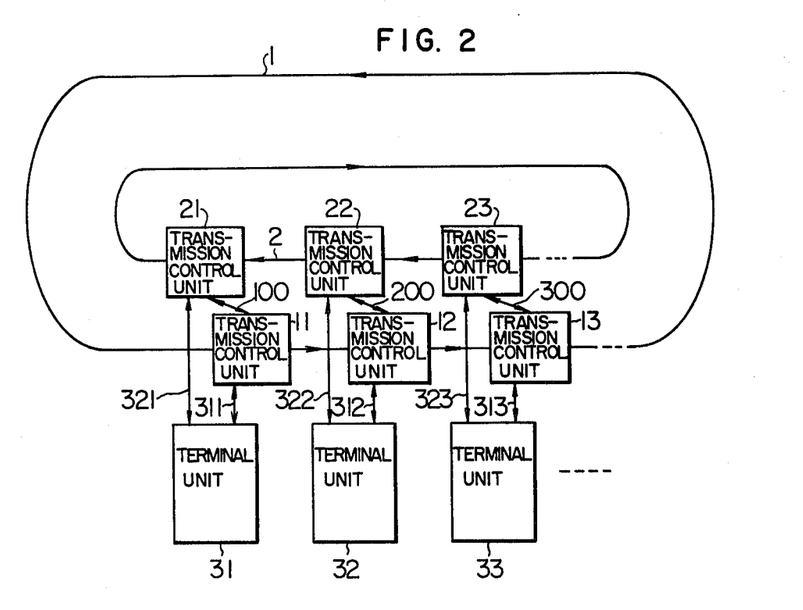
FIG. 2 is a diagram for illustrating the outline of the constitution of a data transmission system to which the status check method of this invention is applied.

A data transmission system shown in FIG. 2 has a loop transmission line 1 which transmits data in the counterclockwise direction and another loop transmission line 2 which transmits data in the clockwise direction. Transmission control units 11, 12 and 13 are connected in the loop transmission line 1 while transmission control units 21, 22 and 23, which are counterparts of the units 11, 12 and 13, respectively, are connected to the loop transmission line 2. The transmission control units 11 and 21, 12 and 22, and 13 and 23 forming a pair are connected by bypass transmission lines 100, 200, and 300, respectively, which can transmit data in both directions, and also connected to terminal units 31, 32, and 33, respectively, by lines 311 to 313 and 321 to 323 which can transmit data in both directions. When the transmission control units 11, 12 and 13 and the loop transmission line 1 are in a normal state, the terminal units 31, 32 and 33 exchange data by using a first major loop formed by the transmission control unit 11 to 13 and the loop transmission line 1. If a second major loop formed by the transmission control units 21, 22 and 23 and the loop transmission line 2 is in a normal state, the terminal unit can use the second major loop for the data exchange. If either of the first and second major loops has a local trouble, the terminal units 31 to 33 exchange data by using a major loop organized by the units 21 to 23, the bypass transmission lines 100, 200 and 300, and loop transmission lines 1 and 2 depending on the trouble point.

Therefore, the construction has the following functions. Namely, under the normal condition, the transmission control units 11 to 23 send data to the downstream side loop transmission line while receive data from the upstream side loop transmission line. If an abnormal state occurs in the transmission system, data can be properly sent to bypass transmission lines 100, 200 and 300 which can be received from these lines.

Figure 3:
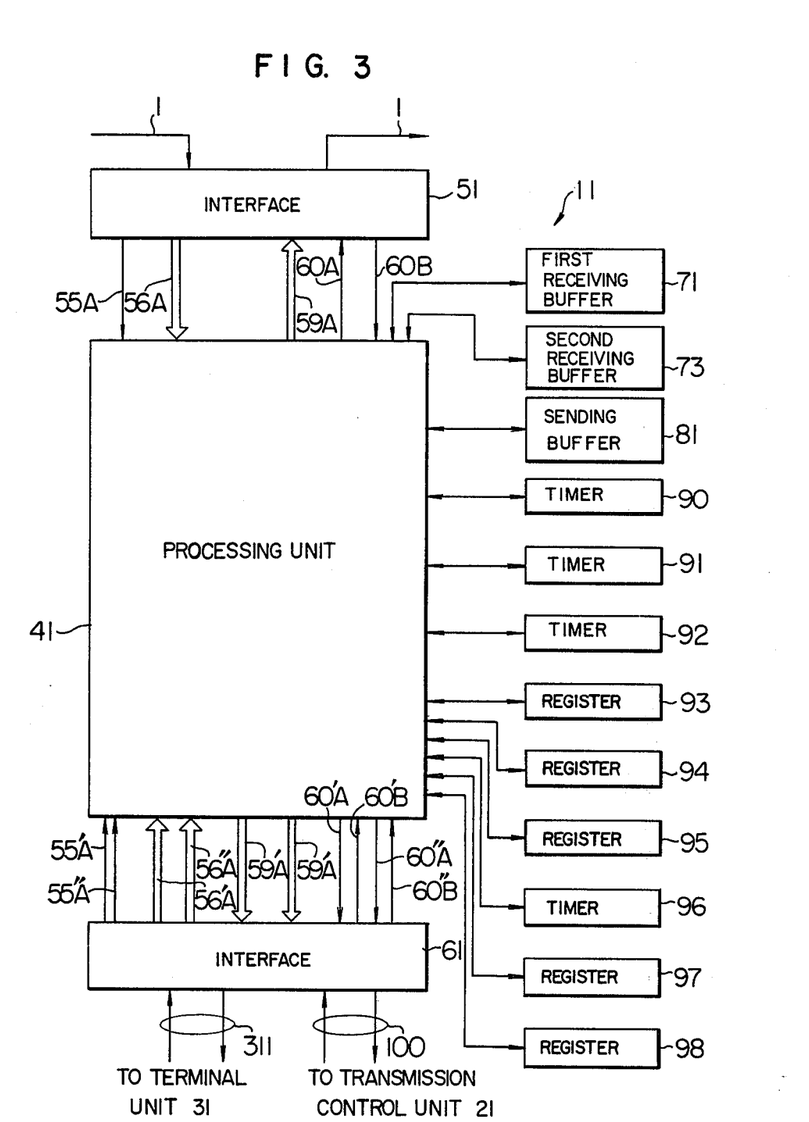
FIG. 3 is a detailed block diagram of the transmission control unit used in the system of FIG. 2.

FIG. 3 shows a block diagram showing the internal circuit of the transmission control unit 11. Other transmission control units have entirely the same construction. The transmission control unit 11 comprises an interface 51 for exchanging data with the loop transmission line 1, an interface 61 for exchanging data with the bypass transmission line 100 and the connection lines 311 to a terminal unit, a first receiving buffer 71 for storing message data from the interface 51, a second receiving buffer 73 for storing the message received from the bypass transmission line 100 through the interface 61, a sending buffer 81 for storing the sending message from the terminal unit 31 as received through the interface 61, a data processing unit 41 for controlling the sending and receiving of these messages, timers 90, 91, 92 and 96, and registers 93 to 95 and 97 and 98. In this transmission control unit 11, the parts other than the interfaces 51 and 61 can be realized by a usual microcomputer.

Figure 4:
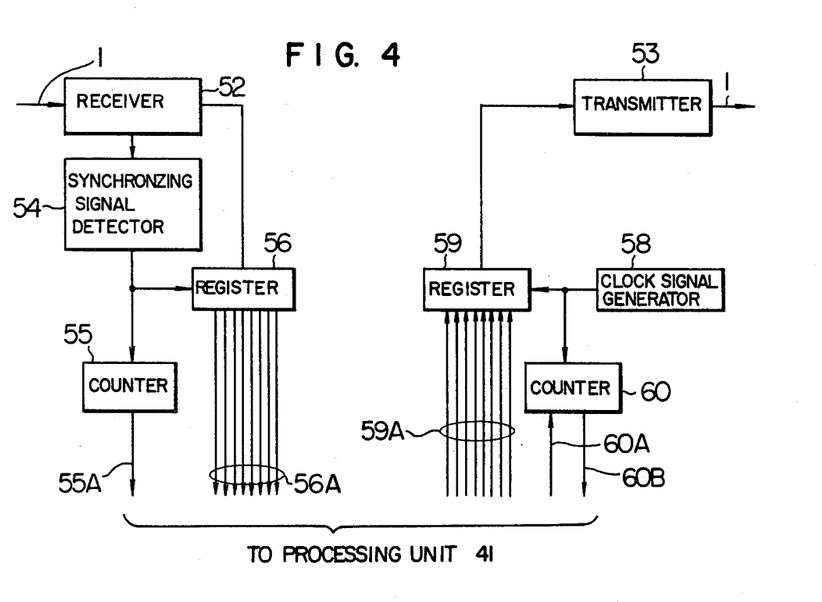
FIG. 4 is a detailed block diagram of an interface 51.

FIG. 4 is a block diagram for illustrating the internal circuit of the interface 51. Two sets of the constitutions, shown in FIG. 4 are used for the interface 61, and the one is used for a connection to the terminal unit 31 while the other for a connection to the bypass transmission line 100. In FIG. 3, the relation of connection between these two sets of interfaces and the processing unit 41 is clarified by primes (') and (") attached to the reference numerals 55A to 60B in FIG. 4.

First, explanation will be made of the sending operation of the interface 51 which sends a set message in the sending buffer 81 to a loop transmission line 1.

When the processing unit 41 detects the presence of a message to be sent in the sending buffer 81, it sends first 8 bits of the message to a register 59 of the interface 51 through lines 59A, and a reset signal to a counter 60 through lines 60A.

The 8-bit data in the register 59 are sent out serially in response to a clock pulse from a clock generator (CLK) 58, and supplied to the loop transmission line 1 through a transmitter 53. The counter 60 is a 3-bit counter which counts the output of CLK 58. When clock pulses of 8 bits are timed up, an overflow signal is given to a line 60B. In response to this overflow signal, the processing unit 41 sends out next 8-bit data of the message in the sending buffer 81 to the register 59. By repeating this operation, the message in the sending buffer 81 can be sent to the loop transmission line 1.

Next, explanation will be made of the operation of receiving a message from the loop transmission line 1 through the interface 51. When the message sent out from the transmission control unit 11 reaches a receiver 52 shown in FIG. 4, a synchronizing signal detector 54 detects the bit sequence of this received message and sends synchronization signals which are synchronized with each bit of this bit sequence. Signals received by the receiver 52 are stored in a 8-bit register 56 in synchronism with the synchronizing signals. A counter 55 is a 3-bit counter which supplies an overflow signal on a line 55A when eight synchronizing signals are counted up. In response to this overflow signal, the data processing unit 41 stores the message of the register 56 into the first receiving buffer 71 in the transmission control unit of 8 bits.

The sending and receiving operations through the interface 61 are done in the same way.

Next, explanation of the operation of the transmission control unit will be made in conjunction with FIGS. 5A to 5F, FIG. 6 and FIG. 7.

In the initial state of the transmission control unit 11, no information is set in both first and second receiving buffers. We assume, further, that timers 90 to 92 stops at the zero state; the registers 93 to 95 are in the zero clear state; the timer 96 stops at the zero state; the register 97 is in the zero clear state; and an address number 11, which is the number of the transmission control unit 11, is set in the register 98.

Figure 6:
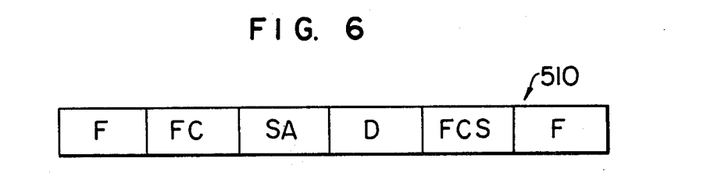
FIG. 6 shows the format of a normal message transmitted in the above transmission system.

Now, consider that sending data, e.g. information, indicating that an M10 train has started from a G station at 12:30 (with a function code FC indicating the persuit of the train, and sub-data indicating the G station, the M10 train and 12:30) is sent to the processing unit 41. The processing unit 41 sets a message 510 as shown in FIG. 6 in the sending buffer 81. The message 510 consists of a flag indicating the beginning part of the message, a function code FC which is sent from the terminal unit 31 and corresponds to a prescribed data function, a sending source address SA indicating a transmission control unit that sends the message (a value read out of the register 98), data D to be transmitted, error detection data FCS for the message, and flag F indicating the end part of the message.

In the sending buffer 81, not only the message to be sent out but also a count value indicating the sending number of the messages are stored. Since the message is not yet sent out, the count value is set at zero.

Figure 5A:
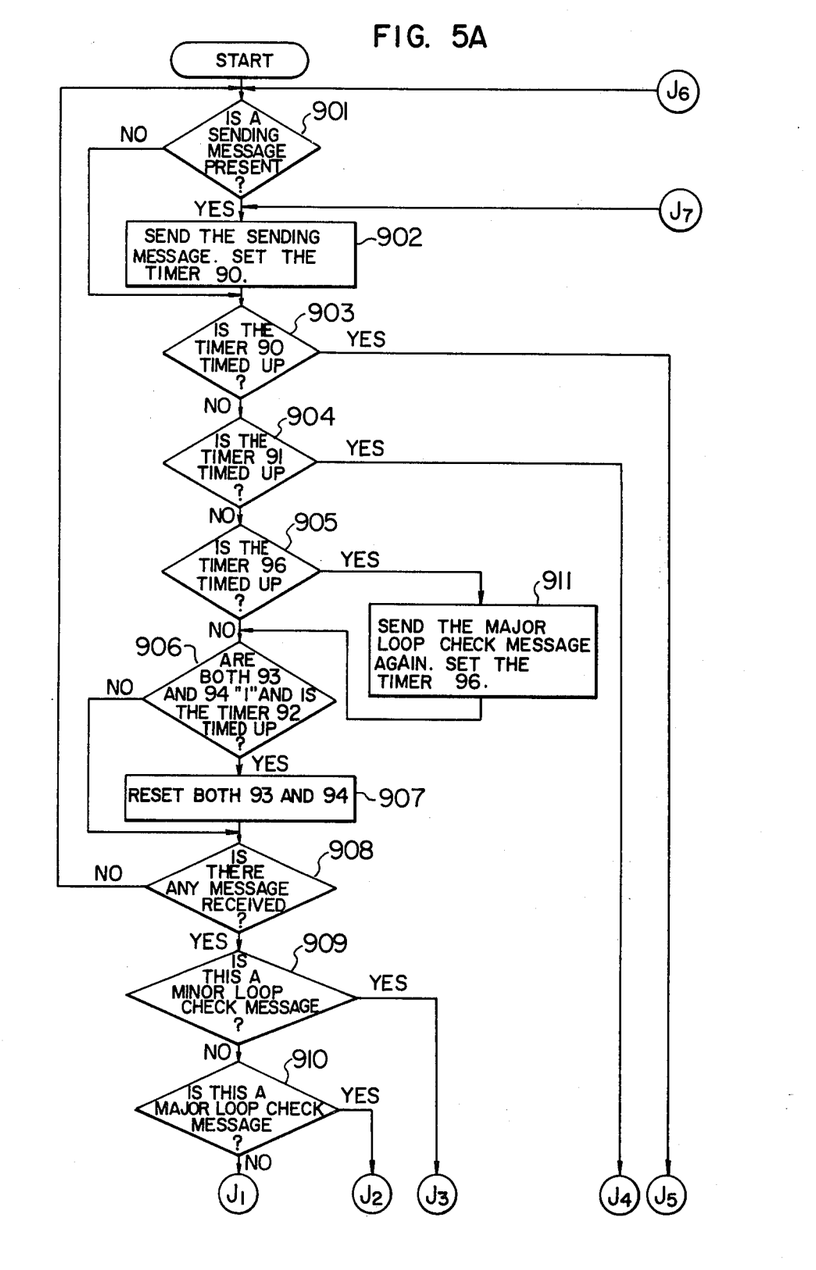
FIGS. 5A to 5F show flow charts for the explanation of the operation of the method of this invention.

Next, the processing of the processing unit 41 will be explained with reference to FIGS. 5A to 5F. First, a decision routine 901 shown in FIG. 5A is executed. Since a message to be sent out is stored in the sending buffer 81, in the decision routine 901, it is confirmed that a sending message exists. The program proceeds to a routine 902, where this message is sent out to the loop transmission line 1 through the interface 51. The sending count value in the buffer 81 is counted up by one. The timer 90 is set, whereby the time-up flag stored in a register of the timer 90 is set at "0" and time from the moment "0" is measured. When the measured time exceeds a preset value which is a little larger than a period required by a message to make a round on the major loop, the time-up flag of the timer 90 is set at "1". At this moment, the time counting operation is stopped.

After the end of the routine 902, the program proceeds to a routine 903. In the case where there is no message to be sent, the program jumps directly from the decision routine 901 to the routine 903.

In the routine 903, it is decided whether the timer 90 has counted up, or not. Now that the timer 90 has not counted up yet, the program proceeds to a routine 904. Since the timers 91, 96 and 92 are not set, the program proceeds from the routine 904 to a routine 908 through routines 905 and 906. In the present case, any message to be sent is not present in both first and second receiving buffer 71 and 73 in the transmission control unit 11, the program returns from the routine 908 to the routine 901.

The message sent out from the transmission control unit 11 in the routine 902 is introduced into the transmission control unit 12 in the downstream through the loop transmission line 1. We assume that the transmission control unit 12 has the same initial state as that of the transmission control unit 11 except that an address "12", which is the number of the transmission control unit 12, is set in the address storing register 98. The data processing unit 41 in the transmission control unit 12 sets the message received through the loop transmission line 1 and the interface 51 in the first receiving buffer 71. Since in the processing unit 41 of the transmission control unit 12 the sending buffer 81 has no message to send, the program jumps from the routine 901 to the routine 903. Further, as in the case of the transmission control unit 11, the program proceeds to the routine 908 through the routines 903, 904, 905 and 906. Then, since the first receiving buffer has a message, the program goes to a routine 909. In the present example, the function code FC of the message has neither function of minor loop nor major loop check, but has a code for expressing the pursuit of train. Therefore, the program proceeds through decision routines 909 and 910 to a decision routine 921 of FIG. 5B, where the sending source address SA of the message is compared with its own address stored in the register 98. Now, the former address is "11" while the latter address is "12". Due to this discrepancy, it is decided that the message is not a self-generated message. Hence, the program goes to a routine 922, where a check is made whether the function code FC of the message 510 is registered in a table stored in advance in a memory (not shown) of each transmission control unit. If FC agrees with a registered code of the table, a routine 923 is executed, in which the message stored in the first receiving buffer 71 is sent to the terminal unit 31 through the interface 61 and the transmission line 312. Then, the program proceeds to a routine 924. In a case where the FC code is not registered in the table, the program jumps directly from the routine 922 to the routine 924. In the routine 924, in accordance with the state of the bypass flag storing register 95, the message is sent out either to the loop transmission line 1 or the bypass transmission line 200. In this case, since the register 95 is in a cleared state, the message is sent to the loop transmission line 1 through the interface 51. After the message to be sent is vanished, the program returns to the routine 901. If the value of the register 95 is "1", the message is sent out to the bypass transmission line 200 through the interface 61.

Figure 5B:
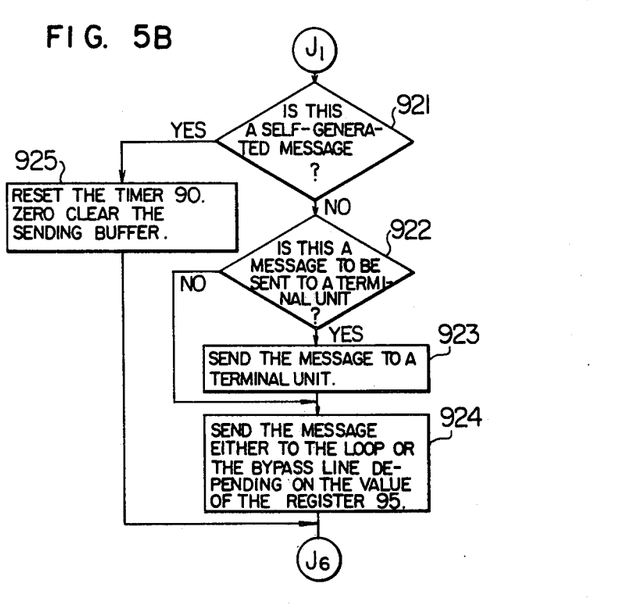
Figure 5C:
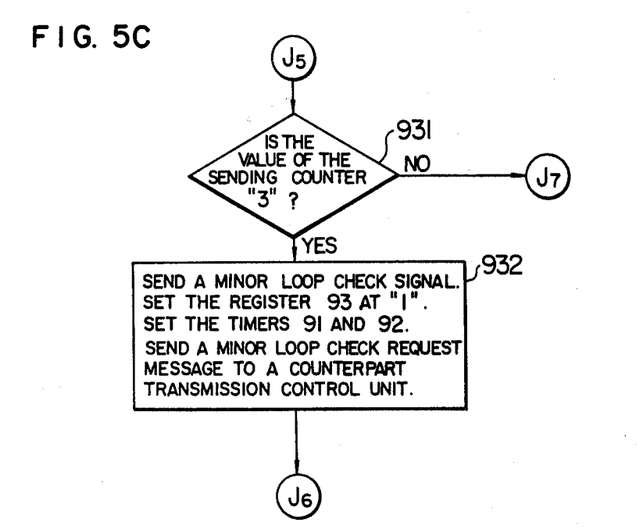
Figure 5D:
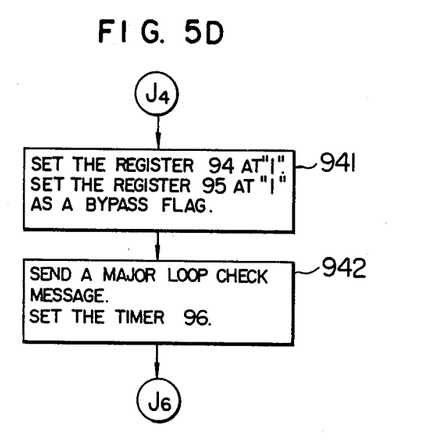
Figure 5E:
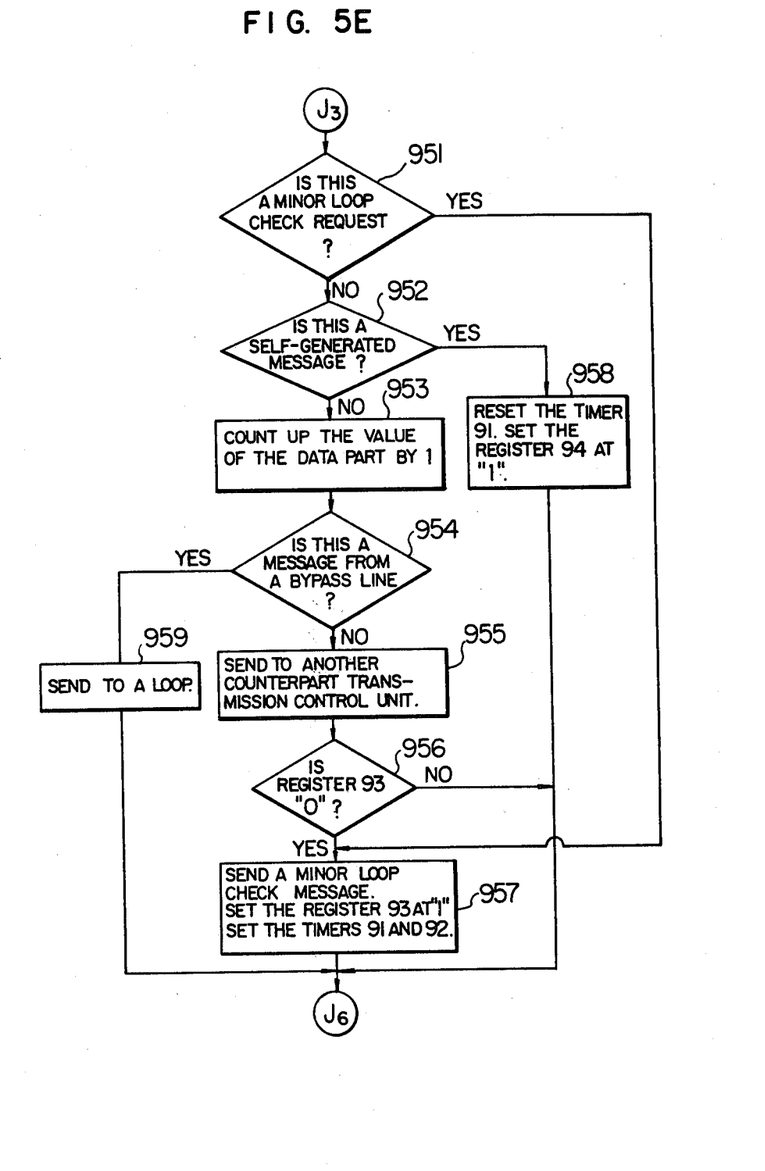
Figure 5F:
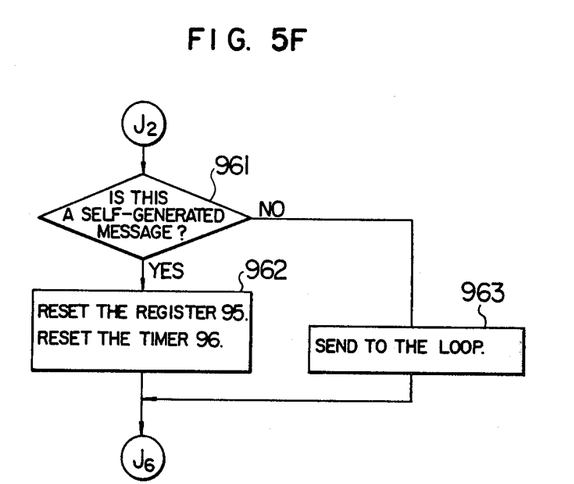

The transmission control unit 13 makes a similar operation as that of the transmission control unit 12. If there is no abnormality in the major loop formed by the loop transmission line 1 and the transmission control units 11, 12 and 13 connected to the loop transmission line 1, the message sent from the transmission control unit 11 makes a round on this loop and returns to the transmission control unit 11 before the timer 90 counts up. The sent back message is introduced into the processing unit 41 through the interface 51, and set in the first receiving buffer 71. In this transmission control unit 11, since the message stored in the first receiving buffer 71 is a self-generated message, the program jumps from the routine 921 to a routine 925, where the timer 90 is reset and the temporal progress of the timer is interrupted. Further, since it is not necessary to repeat the sending of the message that has circulated the major loop, the sending buffer is zero cleared, the corresponding message to be sent in the buffer 81 is vanished, and the value of the sending counter is also set at "0".

If, due to a certain reason, the message does not return to the transmission control unit 11, namely an abnormality happens in the major loop, the time-up flag of the timer 90 is set at "1". The processing unit 41 detects, in the decision routine 903, the "1" state of the time-up flag. The program proceeds to a routine 931 in FIG. 5C, where it is decided whether the value of the sending counter in the sending buffer 81 is equal to a prescribed value, e.g. "3". Now, since the value is "1", the program returns from the routine 931 to the routine 902, and the message that has been stored in the sending buffer 81 and sent out previously is sent out again to the loop transmission line 1. The sending count value in the sending buffer 81 is counted up at every time when a message is sent out. Sending of a message is repeated as long as a message sent out from the transmission control unit 11 does not return to it within a prescribed round-up time. If a message sent out for the third time does not return, or the sending count value is decided to be "3" in the decision routine 931, the processing unit 41 confirms a loop abnormality. In order to search an abnormal point, the program proceeds to a routine 932. For the abnormal point detection, it is examined whether a minor loop check message can make a round or not on every minor loop formed by two adjacent pairs of transmission control units, loop transmission lines connecting these transmission control units, and bypass transmission lines. The processing unit 41 of the transmission control unit 11 resets the sending count value to "0" and sends a minor loop check message to the loop transmission line 1 for checking the downstream minor loop 110. Further, the processing unit 41 sets the timer 91, which sets "1" in the register 93 for indicating the sending of a minor loop check message and informs of the time-up of the return-wait time of the message. The processing unit 41 also sets the timer 92 which informs of the reset timing of the register 93 and the register 94 for indicating the end of minor loop check. A message for requesting an abnormality check of the upstream minor loop 210 is sent to the counterpart transmission control unit 21.

Figure 7:
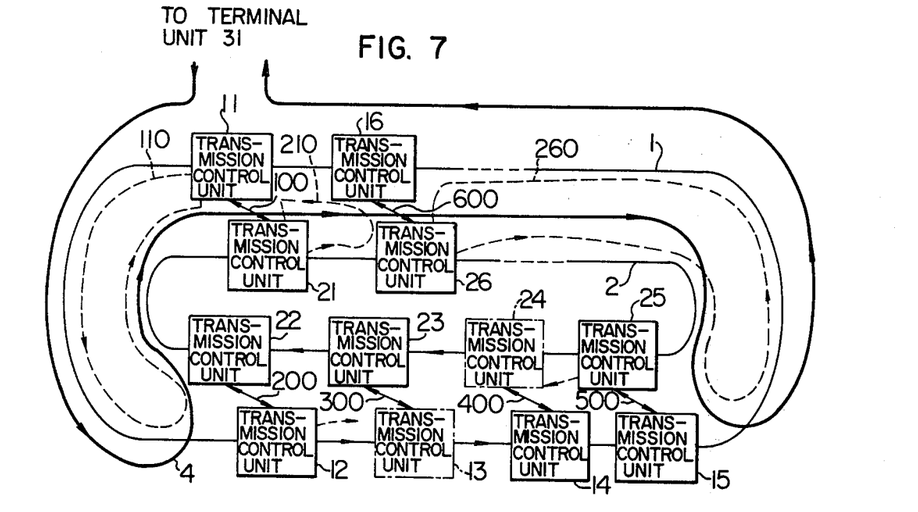
FIG. 7 is a diagram for the explanation of a bypass forming process at the time of trouble in the system of FIG. 2.

Next, explanation will be made of the minor loop check, which is one of the essential parts of this invention, with reference to FIG. 7. In this figure, transmission control units 14, 15, 16 and 24, 25, 26 and bypass transmission lines 400, 500 and 600 are provided additionally to the system of FIG. 2. The constructions of these additional transmission control units are the same as that of the transmission control unit as shown in FIG. 3. In FIG. 7, for simplification, terminal units which should be connected to the transmission control unit 11 and 21, 12 and 22, 13 and 23, 14 and 24, 15 and 26, and 16 and 26 are omitted.

Figure 8:
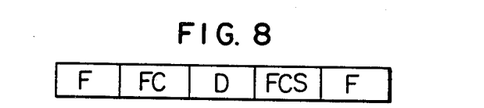
FIG. 8 shows the format of a message for checking a minor loop.

In the transmission control unit 11 which detected an abnormality in the loop transmission system, a minor loop check message as shown in FIG. 8 is sent to the loop transmission line 1 through the interface 51 according to the routine 932. The head of field F of this check message is a message start flag. FC is a function code indicating that the message is for a minor loop check. D is a count value which is counted up at every time when the message passes through the transmission control unit, and currently set at "1". FCS denotes error detection data for the message. The last part F is a flag for indicating the end part of the message. To the counterpart transmission control unit 21, another minor loop check message with a format of FIG. 8 is sent through the bypass transmission line 100. In the latter case, FC has a function code for indicating a minor loop check, while D has data for indicating a minor loop check request. It should be noted here that the minor loop check message and the minor loop check request message have no sending address SA. The timer 91 which is set in the routine 932 has the same function as that of the timer 90. The time-up value of the timer 91 is set in advance at a value a little larger than a period required by the message to make a round on the minor loop 110 comprising the transmission control units, 11, 12, 22 and 21. The timer 92 has the same function as that of the timer 90. The time-up value of the timer 92 is set in advance at a value a little larger than a period required by the minor loop check request to make a round on the loop transmission line 1 and return.

After the process of the routine 932 is finished, the program goes back to the routine 901.

The downstream transmission control unit 12 receives the minor loop check message from the transmission control unit 11 and stores it in the first receiving buffer 71. In this transmission control unit, when the program proceeds to the decision routine 909, it is confirmed that the message stored in the first receiving buffer 71 contains a function code FC indicating the minor loop check. Then, the program proceeds to a routine 951 shown in FIG. 5E. In the routine 951, it is decided whether the data part D of the message has a value corresponding to the check request, or not. Since the data part D is currently "0", which is not a value of check request, the program proceeds from the routine 951 to a routine 952. Here, a check is made as to whether the count D indicating the number of passages through the transmission control units is "3", or not. When the check message makes a round on the minor loop, it passes through three transmission control units. Therefore, if D=3, it can be confirmed that the message is the one that has been sent from the orignating transmission control unit. At this point, the count value D is "0". The program proceeds from the routine 952 to a routine 953, where the count value D is counted up by "1". Then, the program proceeds to a routine 954, where it is decided whether the check message is stored in the first receiving buffer 71 or in the second receiving buffer. Through this process, it is confirmed that the message has come from the loop transmission line or from the bypass transmission line. In this case, since the minor loop check message is read out from the first receiving buffer, it can be discriminated that the message is a receiving message from the minor loop. Hence, the program proceeds to a routine 955, where the minor loop check message is sent from the transmission control unit 12 to its paired transmission control unit 22 through an interface 61. Now, the value of the data D in the message is "1". Next, the program proceeds to a routine 956, where the contents of the registers 93 and 94 are checked. If the both contents are "0", the program goes to a routine 957, where a new minor loop check message is sent out in order to check the state of downstream minor loops. Otherwise, the program returns to the routine 901. In the present example, since the registers 93 and 94 in the transmission control unit 12 have "0", the routine 957 is executed. After "1" is set in the register 93, a new minor loop check message, the data part D of which has an initial value "0", is sent out to the transmission line 1 through the interface 51. At this point, timers 91 and 92 are set and then the program returns to the routine 901.

In the transmission control unit 22, the minor loop check message with the value of data D "1", received from the unit through the bypass line 200, is stored in the second receiving buffer. As in the above-mentioned case of the transmission control unit 12, the program goes from the routine 909 to the routines 951, 952 and 953. The count value D of the message is counted up to "2". The program then proceeds to the routine 954. Since the message is read out from the second receiving buffer 73, it is decided that the message has come from the bypass transmission line. Hence, the program jumps to a routine 959, where the minor loop check message with the value of data D "2" is sent out to the loop transmission line 2.

The transmission control unit 21 receives this minor loop check message with a data value "2", and stores it in the receiving buffer 71. As in the case of the transmission control unit 12, the program goes from the routine 909 to the routines 951, 952, and 953, where the count value D is counted up by "1". In the routine 955, the message with D=3 is sent to the bypass line 100. As described before, the transmision control unit 21 has received a message indicating a minor loop check request from the counterpart transmission control unit 11. In accordance with this receiving operation the register 93 is set at "1", which indicates that the minor loop check message has been already sent out. Hence, the program jumps from the decision routine 956 to the routine 901 without executing the check message generation routine 957. The transmission control unit 11 receives the minor loop check message with D=3 as sent from the transmission control unit 21 and sets this in the seond receiving buffer 73. When the program goes through routines 909 and 951 to the routine 952, since the count value D is "3", it is confirmed that the message is a self-generated minor loop check message that has made a round of the minor loop 201 and returned. The program then proceeds to a routine 958, whereby the timer 91 for the minor loop abnormality check is reset and a flat "1" is set in the register 94, indicating that the minor loop check has been finished. If there is no abnormality in the minor loop, the register 95 for storing a bypass flag holds a value "0", and the message is sent out to the loop transmission line 1 through the interface 51.

On the other hand, the transmission control unit 21 receives the minor loop check request message that is sent from the transmission control unit 11 on the bypass transmission line 100 and stores this in the second receiving buffer 73. When the control operation of the transmission control unit 21 goes to the routine 909, it is detected that the function code FC of this message is a code indicating a minor loop check. Hence, the program proceeds to the routine 951, where it is detected that the data part D of the received message has a particular code indicating a request. Then, the program proceeds to the routine 957, where a check message for checking an abnormality of the upstream minor loop 210 of the transmission control unit 11 is generated. In the transmission control units 26, 16 and 11, the same control operation as mentioned above the transmission control units 12, 22 and 21 previously is done. If the minor loop 210 is normal, a minor loop check message with a counter value D=3 returns from the bypass transmission line 100 to the transmission control unit 21. By decoding this message, the transmission control unit 21 confirms that the minor loop 106 is normal. In this case, in order to show that it is not necessary to use the bypass transmission line 100, the register 95 holds a value "0". In order to indicate that the minor loop check has been finished, the register 94 is set at "1" while the timer 91 is reset.

In this way, a check of the transmission capability of the minor loops 110 and 210 is completed.

Of the units 26, 16 and 11, on the minor loop, that receive and transfer a minor loop check message, the transmission control unit 26 lying on the same loop as the transmission control unit 21 that has sent out this minor loop check message sends a new minor loop check message to the downstream minor loop 260, as the transmission control unit 12 in the minor loop 110 has done, and the register is set at "1". As a result, the presence or the absence of an abnormality in the minor loop 260 connecting the transmission control units 26, 25, 15 and 16 is checked. When the check message makes a round on this minor loop and it is proved that the minor loop is normal, the register 94 of the transmission control unit 26 is set at "1", indicating the completion of the check, and the register 95 holes a value "0".

The transmission control unit 12 also checks the capability of transmission of the minor loop connecting the transmission control units 12, 13, 23 and 22. Now, we assume that the transmission control unit 13 fails. Then, a minor loop check message generated by the transmission control unit 12 does not come back to the transmission control unit 12 before the timer 91 has timed up. In the transmission control unit 12, if it is detected in the routine 904 that the time-up flag of the timer 91 is "1", the program proceeds to a routine 941 in FIG. 5D (the transmission control unit 12 repeats, a prescribed number of times, sending the above-mentioned message for checking the capability of transmission until one of them returns. Unless any possibility of transmission of the minor loop is ensured, it may be arranged such that the program goes to the routine 941). In the routine 941, the flag of the register 94 is set at "1", indicating that the check of transmission capability has been finished, while the register 95 is set at "138 , indicating that this minor loop is abnormal and that the bypass transmission line 200 should be used for subsequent message transfer and sending. Then, the program proceeds to a routine 942, which relates to an operation of checking whether the above-mentioned abnormality has been recovered or not. Details of the operation will be described later.

The transmission control unit 25 that has received the minor loop check message from the transmission control unit 26 also sends a minor loop check message in the same way, and checks the capability of message transmission of the downstream minor loop.

In the example shown in FIG. 7, the transmission control unit 24 is abnormal. Thus, in the transmission control unit 25, in order to indicate that the bypass transmission line 500 should be used, the register 95 is set at "1".

By controlling the state of the register 95 in this manner, each transmission control unit refers to the register to discriminate whether the bypass transmission line is to be used, or not. For example, in FIG. 7, the transmission control units 12 and 25 learn the necessity of using a bypass transmission line. A usual message (other than minor and major loop check messages) received from the loop 1 or 2 is introduced into the first receiving buffer 71, and then transferred to bypass transmission lien 200 or 500, respectively. If the units 22 and 15, the message supplied from the bypass transmission lines is stored in the second receiving buffer 73. If the sending address of the message of this second receiving buffer 73 is not its own address, the message is transferred to the loop transmission line 2 or 1. If the address is its own address, it is decided that the message has made a round through the system. The message is not transferred further. In either case, the content of the second receiving buffer is vanished thereafter. As a result, a message supplied from the loop transmission line 1 to the transmission control unit 12 is transferred to the loop transmission line 2 through the bypass transmission line and the transmission control unit 22, and returns again to the loop transmission line 1 from the transmission control unit 25 through the bypass transmission line 500 and the transmission control unit 15. In this way, a major loop as shown by a thick curve 4 is formed.

In the above-mentioned operation, the timer 92 of each transmission control unit that, as a sending source, has sent out a minor loop check message is set at this sending time of this message by the routines 932 and 957. The time-up period of the timer is set in advance at a value a little larger than a period required by the message to make a round on the normal loop transmission line 1 or 2. In each transmission control unit, routines 906, 907 and 956 are provided in order that no new minor loop check message is sent out, when another minor loop check message is received from an adjacent transmission control unit on the same loop, before the time-up of the timer 92. This prevents any everlasting repeat of the minor loop check process when the loop transmission line 1 recovers to a normal state after a casual abnormality.

In the transmission control units 12 and 25 in which the value of the register 95 is set at "1", or the bypass flag is set, the abnormality recovery check of a round route on the loop transmission lines 1 and 2, or the first and second major loops, respectively, is done in the routine 942 as follows.

For example, the transmission control unit 12 sends a major loop check message to the loop transmission line 1 in the routine 942. After the timer 96 is set, the program returns to the routine 901. The timer 96 has the same function as the timer 92. The time-up period of the timer 96 is set at a value larger than a period required by this major loop check message to make a round on the major loop and return, when the transmission line 1 is normal. The timer 96 is reset when the major loop check message has made a round on the first major loop and returned to the transmission control unit 12. It is monitored in the routine 905 whether the timer 96 has timed up, or not. In the former case, the routine 911 is executed, where the major loop message is sent out again onto the first major loop and the timer 96 is reset. Therefore, as long as an abnormality of the first major loop continues, the major loop check messages are periodically sent out.

The major loop check message has the same format as that of the message shown in FIG. 6, comprising a flag F indicating the beginning of the message, a function code FC indicating the major loop check, the address SA of the sending source of the major loop check message, data D having a value "0", error detection data FCS for the message and a flag F indicating the end part of the message.

When a major loop message sent out from the transmission control unit 12 to the loop 1 reaches the transmission control unit 13, if the transmission control unit 13 has already recovered from a trouble state to a normal state, the message is stored in the first receiving buffer of the transmission control unit 13. In the routine 910, the transmission control unit 13 discriminates that the function code FC of the message is a code indicating the major loop check. The program then proceeds to a routine 961 shown in FIG. 5F, where the value "12" of the address SA of the sending source of this major loop check message is compared with the value "13" of the register 98 which stores the address of the transmission control unit 13 itself. In this case, since the both addresses do not agree with each other, it is confirmed that the message is not a self-generated one. Hence, the program goes to a routine 963, where the major loop check message is transferred to the adjacent transmission control unit 14 through the loop transmission line 1.

When all the transmission control units 13, 14, 15, 16, 11 and 12 on the first major loop and the loop transmission line 1 are normal, check messages are sequentially transferred on the loop transmission line, and return to the sending source transmission control unit 12 to be stored in the first receiving buffer 71 therein. At this time point, the program goes from routines 908, 909 and 910 to the routine 961, where the value "12" of the sending source address SA of the major loop check message is compared with the value "12" of the address register 98 of the transmission control unit 12. Since it is discriminated that the message is a self-generated one, the program proceeds to a routine 962. The fact that the major loop check message has returned means that the abnormality of the major loop has been recovered. Therefore, the bypass operation of the transmission control unit 12 becomes unnecessary. In the routine 962, the register 95 for the bypass flag as well as the timer 96 are reset. After the timer 96 is reset, the routine 911 is executed thereafter and no subsequent major loop check message is sent out.

If the major loop remains still to be abnormal after a prescribed number of major loop checks, the check may be stopped. Instead, a minor loop check may be done. For example, if it is detected in the routine 905 that the timer 96 has timed up, it may be arranged such that the program may go to the routine 932 instead the routine 911 so that a minor loop check is performed after the major loop check.

Although, in the above embodiment, the first and second receiving buffers and the sending buffers 71, 73 and 81, respectively, were provided separately, they may be formed by one buffer which stores a message attached with flag information which can discriminate whether the received message has come from the loop transmission line 1, the bypass line 100 or the terminal unit 31.

Furthermore, in the above embodiment, although the decision as to whether a minor loop check message is a self-generated one is made by monitoring as to whether the count value of a message as counted up for every passage through a transmission control unit is "3" or not, it may be modified as follows.

Namely, in each transmission control unit, if a value set in the data part of the minor loop check message is "2", it may be decided that the message has made a round through the minor loop. In this case, each transmission control unit is forced to make the following dicision operation. That is, if the data value is "2" and the above-mentioned minor loop check message is the one that was received from the loop transmission line, the value of the data part of the minor loop check message is counted up by one and this counted up message is sent to the bypass transmission line. If the data value is not "2" and the received minor loop check message is the one from the bypass transmission line, the value of the data part is not counted up. Then, the message is sent to the loop transmission line without any alteration.

Further, the following decision operation is also possible. First, it is decided whether the value set in the data part of the small loop check message is "1" or not. If it is "1", and the message is the one received from the above-mentioned bypass transmission line, it can be confirmed that the message has made a round through the small loop. In this cace, in each transmission control unit, if the small loop check message is received from the loop transmission line, the data part of the message is not counted up, but the message is sent out to the bypass transmission line without any alteration. In case if a small loop check message with a value of the data part thereof "0" is received from the bypass transmission line, the data value is counted up by one, and the counted up small loop check message is sent out to the loop transmission line.

Next, as another modified example of this invention, explanation will be made of a method of major loop check by using the check message of a message format which does not contain any address indicating an sending source.

Figure 11:
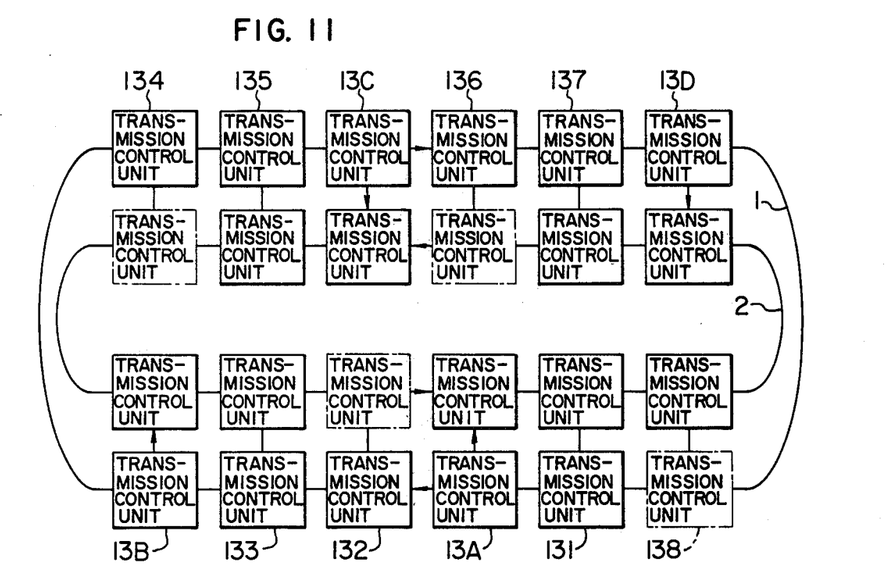
FIG. 11 is a diagram showing a system status for the explanation of the trouble recovering operation.

Now, in a data transmission system as shown in FIG. 11, we assume that transmission control units 13A, 13B, 13C and 13D are forming a bypass transmission line and that a bypass flag "1" is set in the respective registers 95. In this case, transmission control units 13A to 138 have a register 97 for storing the consecutive number of major loop check messages and three registers 99A, 99B and 99C (not shown). The register 99A is set at "1" when a major loop check message having the same through number as that stored in the register 97 is received, while the register 99B is set at "1" when a major loop check message having a different through number from it is received. The register 99C is set at "1" when a self-generated major loop check message is received.

The transmission control units 13A, 13B, 13C and 13D with the register 95 thereof set at "1" send out periodically a check message to the loop transmission line 1 in order to check if an abnormal state in the major loop has been recovered or not. At the initial time point of sending a check message, the register 97 stores an initial value "1" of the consecutive number. In the transmission control units 13A, 13B, 13C and 13D, the value of consecutive number of the register 97 is written into the data part of the check message, and the timer 96 is set when the message is sent out to the loop transmission line.

The major loop check message has a format as shown in FIG. 8, comprising a flag F indicating the beginning of the message, a function code FC indicating a function of major loop check, a data part D in which the value of consecutive number is set, an error detection data part FCS for the message, and a flag F indicating the end part of the message.

Major loop check messages sent out to the loop 1 from the units 13A, 13B, 13C, and 13D are received by adjacent transmission control units 132, 134, 136 and 138, respectively. In the units 132, 134 and 136 under a normal condition, the major loop check message is stored in the first receiving buffer and then sent out to the loop transmission line 1. In the transmission control units 13B, 13C and 13D that have sent out a major loop check message, after the received major loop check message is stored in the first receiving buffer, the value of consecutive number in the data part D of the message is compared with the value in its own register 97. If the values are equal, the same passage number register 99A is set at "1", while otherwise the different consecutive number register 99B is set at "1". In this case, the message with the same consecutive number is not transferred but vanished, only the different passage number message being sent out to the loop transmission line 1. In this manner, the major loop check message is circulated through the transmission control units in the loop transmission line 1. When the timer 96 times up, following processes are done in the transmission control units 13A, 13B, 13C and 13D in accordance with the values set in the registers 99A, 99B and 99C.

Process 1:

Both 99A and 99B have "1", or when 99A has "0" while 99B has "1". It is decided that, besides the transmission control unit itself, there is another transmission control unit that is doing a major loop check. Hence, the registers 99A, 99B and 99C are reset. The value of the consecutive number monitoring register 97 is reset to an initial value "1". The major loop check message having this value in the data part D is sent, and the timer 96 is set.

Process 2:

Register 99A has "1" and 99B has "0". It is decided that a self-generated major loop check message has returned. Hence, the register 99C is set at "1" while registers 99A and 99B are reset and the timer 96 is set.

Process 3-1:

Both 99A and 99B have "0" while 99C has "0". It is decided that a self-generated major loop check message does not return. The value of the consecutive number of the register 97 is counted up by one. A major loop check message attached with this value is sent, and the timer 96 is set.

Process 3-2:

Both 99A and 99B have "0" while 99C has "1". It is decided that, although a self-generated major loop message was received before one period, no major loop message has been sent from any transmission control unit. The bypass flag 95 is zero cleared to cancel any bypass operation.

When receiving and sending processes of a major loop check message are finished in the transmission control units 13A, 13B, 13C and 13D according to the above-mentioned conditions, recovery from an abnormality in the major loop can be detected in the following manner.

Figure 12:
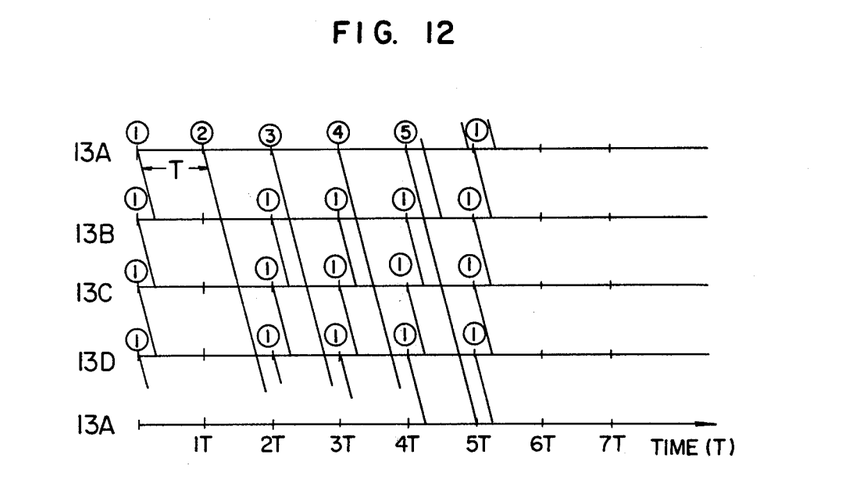
FIG. 12 shows a time chart of the messages in the system of FIG. 11.

FIG. 12 expresses a situation of sending major loop check messages from the transmission control units 13A, 13B, 13C and 13D shown in FIG. 11 as a function of time. ①-⑤ denote a value of consecutive number contained in a message. T denotes a time-up period of the timer 96. At a period of 1T, the process 2 is performed in the transmission control units 13B, 13C and 13D which are receiving a check message having the same consecutive number as that of a message that has been sent from upstream transmission control units 13A, 13B and 13C. Since the transmission control units receive no message, a check message with a passage number ② is generated in accordance with the process 3-1. At a period of 2T, transmission control units 13B, 13C and 13D receive a check message whose consecutive number is equal to that of a message sent from the unit 13A but different from that of self-generated message, and hence generate a check message having a consecutive number ①. The unit 13A generates a message with a consecutive number ③ in accordance with the process 3-1. We assume here that the loop transmission line 1 recovers at a period of 4%. then, transmission control units 13A, 13B, 13C and 13D can receive two kinds of messages having a consecutive number equal to its own number stored in the register 97 and a consecutive number different from it. Therefore, at a period of 5T, all these units send out a check message with a consecutive number ①. At a period of 6T, the transmission control units 13A, 13B, 13C and 13D receive a check message having the same consecutive number as that of the self-generated message. The process 2 is performed, and no check message is generated. At a following period of 7T, since each transmission control unit receives no check message, the bypass flag register 95 is reset by the process (3-2) and a normal transmission mode without using a bypass transmission line is recovered.

Next, as a further embodiment of this invention, explanation will be made of a method for automatically setting an address in those transmission control units in the system its own addresses of which are undefined.

Figure 9:
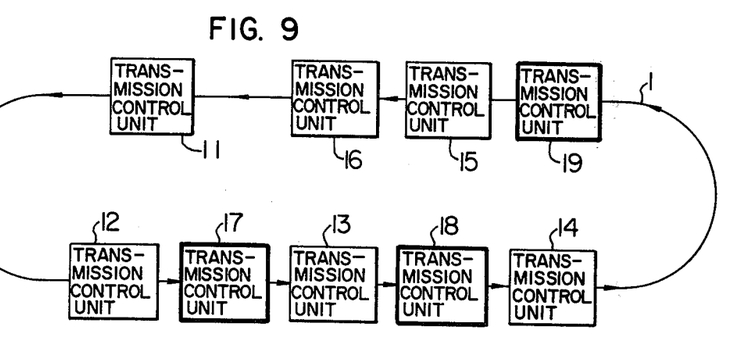
FIG. 9 is a block diagram for illustrating the outline of a loop transmission system containing a transmission control unit, the address of which is not set.
Figure 10:
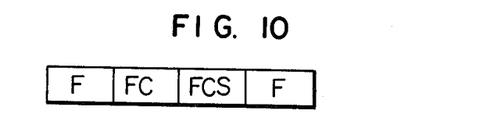
FIG. 10 shows the format of a message for the status check of a major loop and an automatic address setting.

FIG. 9 shows only the outer loop transmission line 1 of the system of FIG. 7 for convenience. In this figure, its own addresses of the transmission control units 17, 18 and 19 are not defined. In the transmission control unit which is now forming a bypass transmission line, when a self-generated major loop check message has made a round through the major loop and returned, the routine 962 is performed in this embodiment. Thereafter, the transmission control unit 12 is forced to send, to the loop transmission line 1, a message with a format of FIG. 6 having a function code FC indicating a communication possibility of the major loop and an address SA of the transmission control unit 12 (sending source address). This message makes a round through the loop transmission line 1 and returns to the transmission control unit 12, where it is discriminated from the address SA that the message is a self-generated one. The message is not sent out further. Of a plurality of transmission control units in the loop transmission line 1, its own addresses are set in the respective registers 98 of the transmission control units 13, 14, 15, 16 and 11, so that these transmission control units simply act to relay the message. On the other hand, the addresses of the transmission control units 17, 18 and 19 are not defined and the respective registers 98 have a value "0". When these units 17, 18 and 19 receive a message having a function code indicating recovery of the major loop, the message is transferred to the downstream of the transmission line and at the same time a message with a format of FIG. 10 having a function code FC indicating automatic address setting is generated. For example, assume that this automatic address set message is generated by the transmission control unit 17. Subsequent operation are as follows. In the transmission control unit 13 that received the above message, a value "13" stored in the register 98 and indicating its own address is inserted as data D between the function code FC and the error detection data FCS, and the message is sent to the adjacent transmission control unit means 18. A value "0" of the address register 98 of the transmission control unit 18 is further added to the data part D of the received message, and the message is sent to the transmission control unit 14. For the automatically address set messages generated by the transmission control units, the address is added at each passage through a transmission control unit, as in the case of the message from the transmission control unit 17. In the transmission control units 17, 18 and 19, following processes are executed in order to detect whether continually received messages are self-generated messages or not. Now, we take the transmission control unit 17 as an example. The data part of an automatically address set message received by the transmission control unit 17 is given by when the transmission control unit 19 is a sending source:

(M1): 15, 16, 11, 12, 0 (first reception),
(M2) 15, 16, 11, 12, 0, 13, 0, 14, 0, 15, 16, 11, 12, 0 (second reception), when the transmission control unit 18 is a sending source:

(M3): 14, 0, 15, 16, 11, 12, 0 (first reception),
(M4): 14, 0, 15, 16, 11, 12, 0, 13, 0, 14, 0, 15, 16, 11, 12, 0 (second reception), when the transmission control unit 17 is a sending source:

(M5): 13, 0, 14, 0, 15, 16, 11, 12, 0 (first reception),
(M6): 13, 0, 14, 0, 15, 16, 11, 12, 0, 13, 0, 14, 0, 15, 16, 11, 12, 0 (second reception).

Therefore, in order that a self-generated automatically address set message be detected by the transmission control unit 17, 18 or 19 that has no own address, the first half number series of the data part of the received message should be compared with the latter half, and a message with the same first and latter parts should be selected. Of the above-described six messages, only M6 satisfys this condition, the other ones M1 to M5 having different first and latter parts.

Specifically speaking, following decision operations are done in each transmission control unit, Process 1':
When an automatically address set message is received, if the address value of the register 98 is not "0", the address value is added to the data part of the message. Thereafter, the message is sent.

Process 2':
If the address value of the register 98 is "0", the address "0" is added to the data part of the message and the following process 3' is executed.

Process 3':
The number of "0" in the data part of the above new message is counted. If it is an odd number, the message is sent out to the loop transmission line 1, while, if the count is an even number N, an address series (referred to as a first half part) from the position of the first address value to the N/2 the "0" of the data part is compared with an address series (referred to as the latter address part) from the N/2 the "0" to the last address value "0". If the both address parts are the same, the following process 4' is performed. Otherwise, the message is sent to the loop transmission line.

Process 4':
It is decided that the message is a self-generated automatically address set message. Depending on the number of addresses "0" in the message, either the following process (4'-1) or (4'-2) is performed to determine its own address. In the process 2', the formed message is not sent out.

Process 4'-1:
If there is only one "0" in the first address part, "1" is added to a maximum of the address values contained in this address part, and this value is taken as the address value of the transmission control unit concerned, and set in the register 98.

Process 4'-2:
If there are more than two "0"'s in the first address part, addresses in front of "0" are compared with one another. It is detected to what order from the smallest value the address in front of the last "0" belongs. If the head of the first half part is "0", it is assumed that the address in front of this "0" has a large value next to that of the address in front of the last "0". When more than two "0"'s continue, it may be assumed that each "0" has an address value corresponding to this rule in the order of small value. If it is discriminated that the address corresponding to the last "0" has an n-th small value, a value obtained by adding "n" to a maximum value of the addresses contained in a message is adopted as its own address that should be set in the register 98 of the transmission control unit.

In this manner, a plurality of transmission control units having no own address can automatically set its own address. Therefore, even in a transmission control unit which lost its address during a failure, its own address can be automatically set when the failure recovers. Similarly, a transmission control unit newly added to the system can also set its own address automatically.

As described above, according to this invention, a minor loop check for finding an abnormal position can be made without address. If a trouble point is identified by the minor loop check, a bypass transmission line can be formed. Furthermore, a major loop check can be made without address. When recovery of the loop is confirmed by the major loop check, the bypass transmission line can be cancelled. Additionally, even for a transmission control unit that is newly added with its address undefined and a transmission control unit that has recovered from a trouble, the address can be set thereat automatically.

We claim:

1. A status check method for a data transmission system, said system comprising a first major loop formed by connecting a plurality of first transmission control units for the control of message transmission with a first loop transmission line for sending the message in a first direction; a second major loop formed by connecting a plurality of second transmission control units for the control of message transmission with a second loop transmission line for transmitting the message in a second direction opposite to said first direction, said first transmission control units being in a paired relation with said second transmission control units; a bypass transmission line capable of bidirectional message transmission and connecting said first and second transmission control units; and a plurality of terminal units provided for each pair of said first and second transmission control units and connected to at least one of said first and second transmission control units to perform sending and selective receiving of a message to and from said first and second major loop;

said first and second transmission control units having a first register means for storing a bypass flag which is referred to for deciding as to whether the message should be given to said bypass transmission line or to said loop transmission line, and a second register means for storing its own address which should be compared with an address field contained in said received message indicating a transmission source, thereby to decide as to whether the received message is a self-generated message; said method being characterized by the following steps:

a first step where one of said first and second transmission control units sends, to the loop transmission line, a check message which contains a data field with an initial value set and a code field indicating a function of checking the state of the minor loop (which connects two adjacent pairs of transmission control units, the one pair containing its own transmission control unit while the other pair contains those on the downstream side), and starts a time counting operation to know the time-over of return time of said check message;

a second step where three transmission control units on said minor loop except the transmission control unit that has sent out said check message rewrite the values of data fields in the received check messages in accordance with a prescribed rule and thereafter transfer the message to adjacent transmission control units on said minor loop; and a third step where said first or second transmission control unit that has sent out said check message decides as to whether the value of the data field in the received message is equal to a prescribed value, and if equality is confirmed, the above-mentioned time counting operation is interrupted while, if a time-over is detected, a bypass flag is set for instructing said first register means to supply subsequent message outputs to said bypass transmission line.

2. A status check method for a data transmission system according to claim 1, in which, in said second step, a unit value is added to the value of the data field of said check message received from said transmission control unit and a message with a new data field as a result of this addition is sent out.

3. A status check method for a data transmission system according to claim 1, in which, in said second step, a unit value is added to the value of the data field of a check message that is received solely by a transmission control unit from said first or second loop transmission line and a message with a new data field as a result of this addition is sent out while a check message received by a transmission control means from said bypass transmission line is sent out without altering the value of the data field thereof.

4. A status check method for a data transmission system according to claim 1, in which, in said second step, a unit value is added to the value of the data field of only the check message that is received solely by a transmission control unit from said bypass transmission line and a check message with a new data field as a result of this addition is sent out, while a check message received by a transmission control unit from said first or second loop transmission line is sent out without altering the value of the data field thereof.

5. A status check method for a data transmission system according to claim 1, comprising a further step of sending a new minor loop check message with an initial value set in the data field thereof to another minor loop (connecting two adjacent pairs of transmission control units, the one pair comprising the transmission control units concerned while the other pair comprises downstream transmission control units), when a transmission control unit adjacent, on the downstream side, to the transmission control unit that has sent out said minor loop check message receives said minor loop check message, whereby a minor loop check operation is made to propagate continuously through said data transmission system.

6. A status check method according to claim 5, comprising a fifth step in which a transmission control unit that has sent out said minor loop check message sends a second message having a function code requesting a check of an upstream minor loop to a counterpart transmission control unit, and a sixth step in which, in response to receipt of said second message, said latter transmission control unit sends a new minor loop check message with an initial value set in the data field thereof to said minor loop, whereby a minor loop check operation propagates through the whole data transmission system with a transmission control unit as a start point of the disclosure.

7. A status check method for a data transmission system according to claim 1, 5 or 6, comprising a seventh step in which a transmission control unit with a bypass flag set in the first register thereof sends a third message containing a function code indicating an operation for checking recovery from an abnormality to a loop transmission line of either one of the first and the second major loop to which said transmission control unit belongs.

8. A status check method for a data transmission system according to claim 7, where said third message sent out in the seventh step contains an address of the transmission control unit that has sent out said message, further comprising an eighth step in which a transmission control unit with a bypass flag set in said first register thereof resets said bypass flag when the third message received by said transmission control unit has the same address as its own address that is stored in said second register.

9. A status check method for a data transmission system according to claim 7, in which said third message sent out in the seventh step has a value indicating a consecutive number of message, and further comprising the eighth step in which when a transmission control unit with a bypass flag set in the first register thereof detects that only one receipt of a third message having the same passage number as its stored own one has happened in a prescribed period, the bypass flag of its own first register is reset.

10. A status check method for a data transmission system according to claim 1, 5 or 6, comprising a ninth step in which when a transmission control units with a bypass flag set in the first register thereof detects the recovery of an abnormality of either one of said first and second major loop to which said unit belongs, said bypass flag in said first register is reset and a fourth message having a prescribed function code is sent to said major loop transmission line to which said unit belongs;

a tenth step in which when a transmission control unit with its own address in the second register thereof undefined receives said fourth message, said fourth message is transferred to an adjacent transmission control unit on said major loop and at the same time a fifth message having a function code field indicating an automatic address setting operation and a data field is sent to said major loop;

an eleventh step in which when a transmission control unit on said major loop receives said fifth message, an address value stored in said second register is added to the data field of said fifth message and the message is sent to a following transmission control unit on said major loop; and a twelfth step in which when a transmission control unit has sent a fifth message and receives this message, the value of its own address is identified from the decision of a group of address numbers contained in the data field of said message and this value is set in its own first register.

* * * * *